Figure 1:
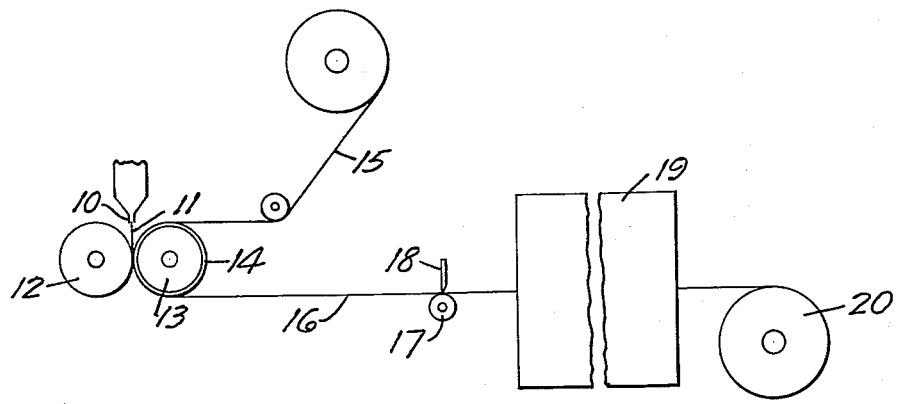

Jan. 21, 1964    G. L. GROFF ETAL    3,118,534
PRESSURE-SENSITIVE ADHESIVE TAPE
Filed Dec. 16, 1959

INVENTORS
GAYLORD L. GROFF
HERBERT M. BOND
BY
Carpenter, Abbott, Coulter & Kinney
ATTORNEYS

United States Patent Office 3,118,534
Patented Jan. 21, 1964

3,118,534
PRESSURE-SENSITIVE ADHESIVE TAPE
Gaylord L. Groff, North St. Paul, and Herbert M. Bond, Stillwater, Minn., assignors to Minnesota Mining and Manufacturing Company, St. Paul, Minn., a corporation of Delaware
Filed Dec. 16, 1959, Ser. No. 859,998
4 Claims. (Cl. 206—59)

This invention relates to pressure-sensitive adhesive sheet or tape which is particularly useful as electrical insulating tape. In a preferred construction, the pressure-sensitive adhesive coating, after application of the tape as electrical insulation, can be heat-cured to an essentially thermoset state for improved resistance to solvents, lubricants, transformer oils and the like.

The most widely used thermosetting pressure-sensitive adhesive tapes for electrical insulation have a paper backing unified with heat-cured rubber-resin saturant. While this is a relatively low-cost tape product, its construction requires fine formulation and process control to obtain good resistance to delamination upon unwinding from roll form and to achieve the proper balance between adhesive and backing compositions necessary to good electrical, chemical and adhesive properties.

For situations requiring a higher degree of electrical insulation, a common construction consists of plastic film (e.g., tensilized polyethylene terephthalate film) and paper joined by a laminating adhesive, followed by application of a pressure-sensitive adhesive coating to the other side of the paper. This construction is appreciably higher in cost than rubber-resin saturated tape due to the added cost of the plastic film. Efforts have been made to reduce the cost of the laminated construction by omitting the laminating adhesive and instead fusing plastic film to the paper backing. Heretofore, no advantage has been thus realized over tape products already on the market.

We have now devised a novel pressure-sensitive adhesive tape which is characterized by simplicity and economy of construction while providing the high degree of electrical insulation previously attained only in higher cost, adhesively laminated tapes. Briefly, our novel adhesive tape comprises a thin flexible fibrous web such as paper, a normally tacky and pressure-sensitive adhesive coating firmly united to one surface of the web, and a film of crystalline polypropylene fusion-bonded to the other surface of the web and completely covering that surface. For convenience in marketing and use, the novel tape is preferably capable of being unwound from roll form without the use of a disposable liner, in which event it may be necessary to apply to the exposed side of the polypropylene film a low-adhesion backsize coating which is inactive to the tacky adhesive to a degree permitting easy unwinding of the tape without delamination or offsetting of adhesive.

Figure 2:
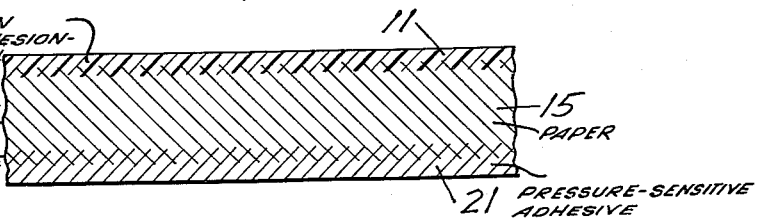

A better understanding of the invention may be gained by reference to the drawing in which:

FIGURE 1 schematically represents a preferred method for constructing our novel pressure-sensitive adhesive tape product; and FIGURE 2 illustrates the product of that construction by a magnified cross-sectional view.

As shown in FIGURE 1, molten crystalline polypropylene is extruded through an orifice 10 to produce a continuous film 11 which is carried a short distance to the nip of a pair of laminating rolls 12 and 13. Each of these rolls is approximately six inches in diameter. The roll 12 has a chrome-plate steel surface while the roll 13 is provided with a silicone rubber sleeve 14 about 0.5 inch in thickness. The peripheral speed of the rolls 12 and 13 is adjusted to draw the film down to a desired thickness at the nip of the rolls, at which point it is joined to a continuous sheet of paper 15 or other thin flexible fibrous web. By virtue of the proximity of the extruding orifice 10 to the laminating rolls 12 and 13, the film is sufficiently soft as it contacts the paper 15 that it fuses and penetrates into the paper so that, after cooling, attempts at separating the film from the paper tear the paper. The laminated sheet 16 thus formed is carried between a mechanically driven guide roll 17 and an adjustable coating knife 18, where is applied from a source of supply not shown, a coating of pressure-sensitive adhesive dissolved or dispersed in volatile liquid. The coated sheet then passes to an oven 19 to dry the adhesive coating and is wound into roll form by means of a mechanically driven windup roll 20.

The pressure-sensitive adhesive sheet thus produced is shown in FIGURE 2 to consist of a paper sheet 15, to one surface of which is fusion-bonded a thin film of crystalline polypropylene 11 and to the other surface of which is firmly united an exposed dried coating of pressure-sensitive adhesive 21 which penetrates well into the paper sheet 15.

In the following specific examples, all parts are given as parts by weight.

Example I

Polypropylene having a reduced specific viscosity of about 5 (determined with 0.1% solution of the polymer in decalin at 135° C.), a melting point of 167° C. and a density of 0.901 gram per cubic centimeter, about 90–95% of which was in isotactic form, was heated to a temperature of 310° C. in a 2.5-inch plastics extruder equipped with a conventional screw for polyethylene extrusion. The die orifice, which also was maintained at 310° C., measured 0.020 inch (20 mils) across and 20 inches in length. With apparatus set up essentially as illustrated in FIGURE 1 of the drawing, the crystalline polypropylene was extruded downwardly to the nip of a pair of laminating rolls which were rotating at a peripheral speed of 20 feet per minute and there continuously fused to a sheet of unbleached long-fibred rope paper (24.5 lb. "Flexrope" flatstock) having a caliper thickness of 3 mils. The laminated sheet thus produced was 4.0 mils overall thickness, with the polypropylene penetrating about 0.5 mil into the paper.

Over the exposed surface of the paper was then knife-coated a 15% solids solution in toluene and alcohol of a composition consisting essentialy of the copolymer of 96 parts isooctyl acrylate and 4 parts acrylic acid admixed with 15 parts of polymeric amine per 100 parts copolymer. The polymeric amine was the addition product of polymerized long chain fatty acids and polyfunctional primary and secondary amines, had a molecular weight of 3000–6000, a Ball and Ring softening point of 43° C. (ASTM 1240), and 603–675 grams thereof neutralize one gram equivalent of acid. It is available in commerce under the trade name "Versamid 100".

This coating was first dried for 3 minutes at 65° C. followed by 5 minutes at 85° C. to provide a pressure-sensitive adhesive tape product of 5.2 mils overall thickness. The dried weight of the adhesive was about 13 grains per 24 square inches.

The tape product was wound upon itself in roll form and when unwound at normal unwind speeds showed no tendency to delaminate. However, the paper showed a tendency to split at very slow unwind speeds, so that it would be preferred for many purposes to provide the polypropylene with a low-adhesion backsize coating, as in the succeeding examples.

The dielectric strength of the tape product was 848 volts per mil. Adhesion to steel (ASTM D1000–57T) was 48 ounces per inch.

Solvent and oil resistant electrical insulation of high quality was obtained by winding the tape product half-lapped around the copper coils of an electric motor followed by heating for two hours at 130° C. to cure the adhesive.

*Example II*

The exposed polypropylene surface of the 4.0-mil laminated sheet of Example I was treated so that a low-adhesion backsize coating could be firmly united thereto. In this treatment, the laminated sheet (prior to application of adhesive) was directed around a rotatable 16-inch steel drum which was electrically connected to ground. Concentrically located ½ inch from the surface of the drum was a semi-cylindrical steel shroud to which was applied about 8000 volts from an alternating current generator at 300 cycles per second. With the film moving around the drum at 15 feet per minute and with the polypropylene surface facing outwardly, the continuous electrical discharge between the shroud and drum effectively primed the exposed surface of the film so that the copolymer of 60 parts of octadecyl acrylate and 40 parts of acrylic acid could be firmly united thereto as a low-adhesion backsize coating.

To prepare a pressure-sensitive adhesive tape, the following composition was used:

| | Parts by weight |
|---|---|
| Crude rubber | 100 |
| Zinc oxide | 50 |
| Wood rosin | 30 |
| Terpene resin | 30 |
| Mineral oil | 12 |
| Antioxidant | 2 |
| Heptane | 1065 |

The terpene resin was a polymerized beta-pinene resin of essentially zero acid number. Twenty parts of this resin had a melting point of 115° C. ("Piccolite S-115") and the other 10 parts had a melting point of 25° C. ("Piccolite S-25"). The antioxidant was condensation product of acetone and aniline melting at 120° C. ("Flectol H").

This composition was knife-coated on the paper surface of the backsized laminated sheet and then dried at 67° C. for 3 minutes followed by 85° C. for 5 minutes. The weight of dried adhesive was about 11 grains per 24 square inches.

This tape product was unwound from the roll and subjected to tests, with the following results:

| | |
|---|---|
| Caliper thickness | 5.0 mils. |
| Dielectric strength | 780 volts per mil. |
| Insulation resistance (ASTM D257–57T) | 30–90 megohms |
| Adhesion to steel | 28 ounces per inch. |
| Tensile strength | 32 pounds per inch. |
| Ultimate elongation | 4%. |

The tensile data was measured on the Instron Tensile Tester with a one-inch wide tape at an initial jaw separation of 4 inches and separation rate of 12 inches per minute.

Because the tape product of this example has a permanently thermoplastic adhesive coating, it has limited utility for applications involving possible contact with solvents and oils but provides excellent electrical insulation where such contact is not anticipated and also is useful in nonelectrical holding and sealing applications.

*Example III*

Extruded crystalline polypropylene was continuously fused to the paper of Example I by the same procedure except that the laminating rolls were rotated at a peripheral speed of 27 feet per minute to provide a laminated sheet of only 3.6 mils overall thickness. The exposed polypropylene surface was then treated for adhesion and backsized as in Example II, after which a pressure-sensitive adhesive tape composition similar to that of Example II was applied. However, to make the adhesive coating thermosetting, the composition included 20 parts per 100 parts of rubber of a para-tertiary-butyl phenol formaldehyde resin made with an alkaline catalyst and 1.5 to 2.0 mols of formaldehyde for each mol of substituted phenol.

The adhesive composition was prepared to 37% solids content, and because of this high concentration, bubbling was encountered in direct application of sufficient thickness to provide a tacky pressure-sensitive adhesive coating. The bubbling was averted by diluting a portion of the composition to about 20% solids and first applying a thin layer of this portion with a roll-coater, followed by application of a heavier layer of the undiluted composition with a knife-coater. The composite coating was then dried for 3 minutes at 50° C. followed by 5 minutes at 95° C. to provide a bubble-free adhesive layer weighing 13 grains per 24 square inches. Approximately 15% of the adhesive was applied with the roll-coater.

The tape product was later unwound from roll form and tested, as indicated below:

| | |
|---|---|
| Caliper thickness | 5.2 mils. |
| Dielectric strength | 350 volts per mil. |
| Insulation resistance | 100–300 megohms. |
| Adhesion to steel | 60 ounces per inch. |
| Tensile strength | 47 pounds per inch. |
| Ultimate elongation | 4%. |

After the tape product of this example is wound in place in lapped fashion over an electrical coil or the like, it should be heated for about two hours at 130° C. to cure the adhesive to a highly oil and solvent resistant state, whereby almost impervious electrical insulation is attained.

*Example IV*

A laminated sheet was prepared in the same manner as in Example I except that highly purified kraft paper (35 lb. "Duracel" crepe) of 8-mil thickness was employed. The crystalline polypropylene was drawn to a thickness of about 1 mil and fused to the smoother side of the paper.

The exposed surface of the polypropylene was then given a glow discharge treatment. In the apparatus used for this treatment, a solid stainless steel plate 14 inches square and a perforated stainless steel plate of the same size were mounted with the latter parallel to and about one inch above the former. The solid plate was maintained at +200 volts and the perforated steel plate at −100 volts. With the apparatus at a pressure of 300–500 microns of mercury, current flow was steady at about 8 amperes. Under these conditions, a 6-inch wide strip of the laminated sheet with the exposed polypropylene surface underneath was passed above the perforated plate at a distance of 0.5 to 1 inch and at a rate of 9 feet per minute. By this exposure, the polypropylene surface was effectively primed for good anchorage of a low-adhesion backsize coating. The backsize coating of Example II was then applied.

On the paper side of the polypropylene-paper laminate was knife-coated in a single step the adhesive composition of the preceding example, except at a solids concentration of 30%. After drying at 67° C. for 3 minutes and 85° C. for 5 minutes, the adhesive coating weighed 25 grains per 24 square inches. It contained a few bubbles but these were deemed to be relatively inconsequential for many commercial uses.

The tape product of this example, when unwound from the roll, demonstrated these properties:

| | |
|---|---|
| Caliper thickness | 11.5 mils. |
| Dielectric strength | 250 volts per mil. |
| Insulation resistance | 90–200 megohms. |
| Tensile strength | 32.8 pounds per inch. |
| Ultimate elongation | 21%. |

This tape has particular utility in applications requiring some stretchiness and good conformability.

The tape products of the foregoing examples show no tendency to tarnish copper when adhered thereto for prolonged periods. This property, coupled with their electrical insulating properties and good tensile strength and tear resistance, makes the novel tape products particularly useful for holding electrical coils in place. They also have demonstrated nonelectrical utility, e.g., as masking tapes. The glossy nonadherent surface of the polypropylene, particularly when provided with a low-adhesion backsize, releases readily from lacquers, tile cements, and other strongly adherent compositions so that no difficulty is encountered in cleanly stripping the tape away after such use.

By coloring one or more of the layers of polypropylene, paper and adhesive, the novel tape products may be used for decorative purposes at substantial reduction in cost, without decrease in quality, as compared to many decorative pressure-sensitive adhesive tapes now on the market.

The dielectric strength, tensile strength, tear resistance and puncture resistance of the novel tape products, when fabricated as illustrated in the drawing, may be varied to a great extent simply by changing the speed of the laminating rolls and thereby the thickness of the polypropylene. For most uses, a thickness of about one mil has been found to be adequate, but substantial improvement in properties such as those mentioned above is realized at somewhat greater thicknesses.

Although the only crystalline polypropylene which is presently commercially available is in isotactic form, the syndiotactic structure (substituent methyl groups alternating regularly from one side of the chain to the other) should also be crystalline and of sufficiently high melting point to be useful in our invention. Other copolymerizable monomer should be permissible in the propylene polymer as long as the polymer is essentially crystalline and its melting point is not below about 160° C. It is highly desirable that the melting point be at least 160° C. since it is often desired to dip coils wrapped with the tape in hot varnish which might otherwise deleteriously affect the tape. Moreover, the propylene polymer must be resistant to the heat applied in curing the pressure-sensitive adhesive, if the adhesive is thermosetting.

In addition to various papers such as disclosed in the above examples, woven and nonwoven fabrics have utility as the fibrous web of our novel tape product. In one construction was used a mat of randomly intermingled polyethylene terephthalate fibers, approximately half of which had been oriented by cold drawing while the other half were undrawn and fused at their crossing points to lend integrity to the mat. By employing such a mat instead of paper, the resistance of the tape product to the effects of heat and chemical attack was appreciably improved, but at increased cost.

We claim:

1. A thermosetting pressure-sensitive adhesive tape wound upon itself in roll form and capable of being unwound therefrom and adapted to be wound in place in lapped fashion over an electrical coil and of then being heated to cure the adhesive to an oil and solvent resistant state, said adhesive tape consisting essentially of a continuous sheet of paper, a thermosetting pressure-sensitive adhesive coating firmly united to one surface of the paper, a film of crystalline polypropylene fused to the other surface of the paper and completely covering that surface, the exposed face of the polypropylene having been treated by an adhesion-promoting electrical discharge, and a low-adhesion backsize coating on the adhesion-promoted face of the polypropylene.

2. The method of continuously making a pressure-sensitive adhesive tape which provides a high degree of electrical insulation, said method consisting essentially of the steps of extruding a film of crystalline polypropylene, fusing the polypropylene to one surface of a continuous sheet of paper, treating the exposed face of the polypropylene to promote adhesion by continuous electrical discharge, applying a low-adhesion backsize coating to the treated polypropylene face, coating the other surface of the paper with a solution of a thermosetting pressure-sensitive adhesive, drying the adhesive coating, and winding the pressure-sensitive adhesive tape thus formed upon itself in roll form for storage and shipment.

3. A pressure-sensitive adhesive tape adapted to be wound in place in lapped fashion over an electrical coil, said adhesive tape consisting essentially of a continuous thin flexible fibrous web, a pressure-sensitive adhesive coating firmly united to one surface of the web, a film of crystalline polypropylene fused to the other surface of the web and completely covering that surface, the exposed face of the polypropylene having been treated by an adhesion-promoting electrical discharge, and a low-adhesion backsize coating on the adhesion-promoted face of the polypropylene.

4. The method of continuously making a pressure-sensitive adhesive tape which provides a high degree of electrical insulation, said method consisting essentially of the steps of extruding a film of crystalline polypropylene, fusing the polypropylene to one surface of a continuous thin flexible fibrous web, treating the exposed face of the polypropylene by continuous electrical discharge to promote adhesion, applying a low-adhesion backsize coating to the treated polypropylene face, coating the other surface of the web with a solution of a pressure-sensitive adhesive, and drying the adhesive coating.

References Cited in the file of this patent

UNITED STATES PATENTS

| 2,458,166 | Homeyer | Jan. 4, 1949 |
| 2,561,063 | McBurney et al. | July 17, 1951 |
| 2,789,096 | Bruno et al. | Apr. 16, 1957 |
| 2,825,721 | Hogan et al. | Mar. 4, 1958 |
| 2,879,177 | Nelson et al. | Mar. 24, 1959 |
| 2,939,860 | Schramm | June 7, 1960 |

FOREIGN PATENTS

| 215,448 | Australia | Nov. 29, 1956 |

OTHER REFERENCES

"Moplen" Technical Information, 8 pages; Chemore Corp., New York, 1957.